United States Patent [19]
Amborn et al.

[11] Patent Number: 5,287,768
[45] Date of Patent: Feb. 22, 1994

[54] DRIVESHAFT

[75] Inventors: Peter Amborn, Neunkirchen; Klaus Greulich, Hollig, both of Fed. Rep. of Germany

[73] Assignee: GKN Automotive AG, Siegburg, Fed. Rep. of Germany

[21] Appl. No.: 676,187

[22] Filed: Mar. 27, 1991

[30] Foreign Application Priority Data

Apr. 5, 1990 [DE] Fed. Rep. of Germany ....... 4011082

[51] Int. Cl.$^5$ ............................................. F16C 3/00
[52] U.S. Cl. ................................. 74/607; 464/180; 464/183; 301/124.1
[58] Field of Search ...................... 74/607, 567; 464/180–183, 81, 112, 149, 158; 301/124 R

[56] References Cited

U.S. PATENT DOCUMENTS

| | | | |
|---|---|---|---|
| 2,380,952 | 8/1945 | Dewey | 464/183 X |
| 3,292,389 | 12/1966 | Adloff et al. | 464/180 X |
| 4,380,443 | 4/1983 | Federmann et al. | 464/183 X |
| 4,392,839 | 7/1983 | Aucktor | 464/183 |
| 4,421,497 | 12/1983 | Federmann et al. | 464/181 |
| 4,527,978 | 7/1985 | Zackrisson | 464/183 |
| 4,747,799 | 5/1988 | Kato | 464/180 X |
| 4,820,241 | 4/1989 | Nakamura | 464/183 |

FOREIGN PATENT DOCUMENTS

| | | | |
|---|---|---|---|
| 722473 | 3/1932 | France | 464/183 |
| 60-168913 | 9/1985 | Japan | 74/607 |
| 2108630 | 5/1983 | United Kingdom | 464/183 |
| 2202029 | 9/1988 | United Kingdom | 464/180 |

*Primary Examiner*—Vinh T. Luong
*Attorney, Agent, or Firm*—Harness, Dickey & Pierce

[57] ABSTRACT

A driveshaft for a motor vehicle is designed to be asymmetrical, with the center of symmetry of the central tube region or center of gravity of inertia being located outside the tubular shaft center. Thus, it is possible to obtain a driveshaft whose cross sectional area is distributed in such a way that it is functionally optimized and which meets the respective strength requirements, and noise reduction is achieved by displacing the natural resonance frequency of the driveshaft into a region of minimum external excitation.

17 Claims, 4 Drawing Sheets

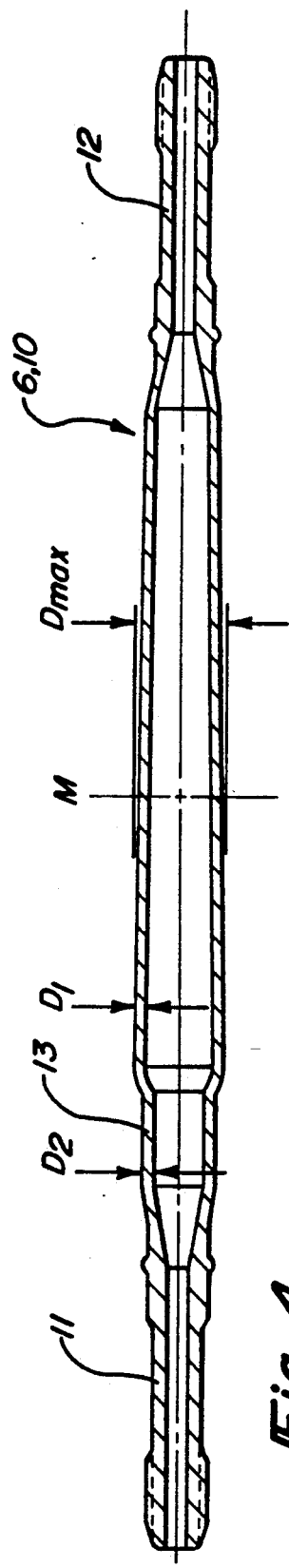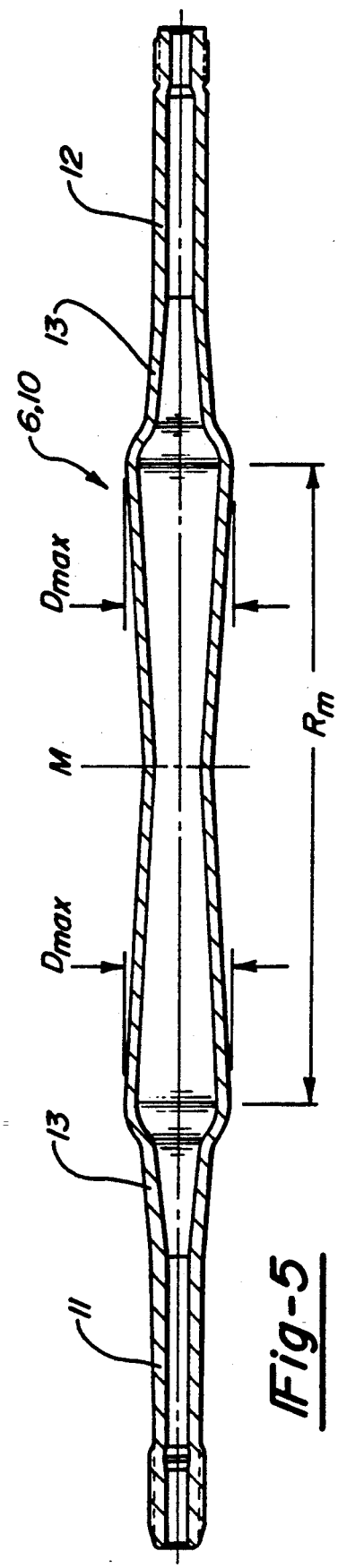

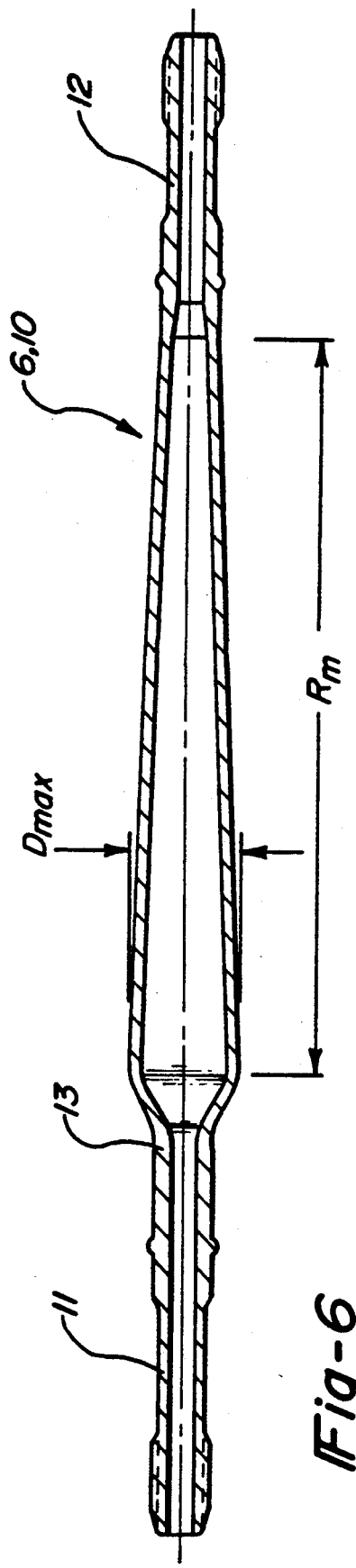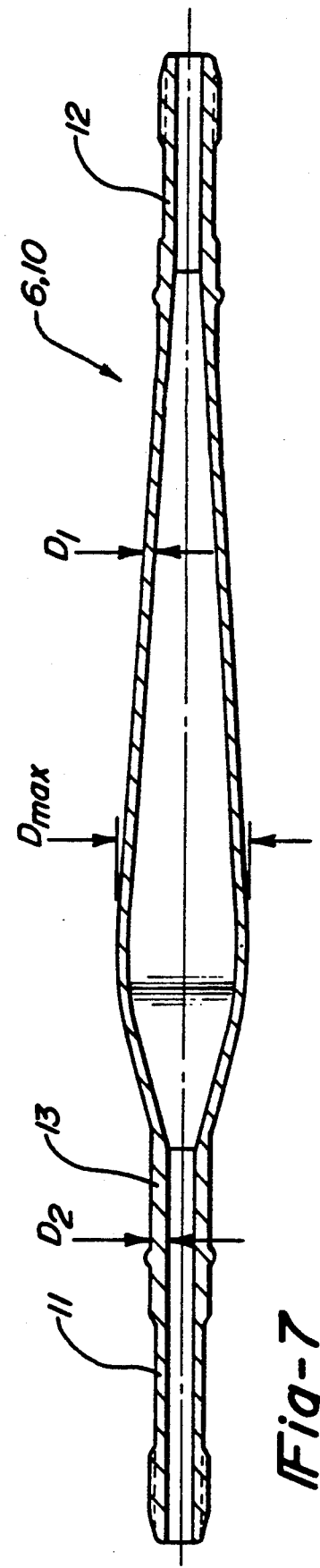

DRIVESHAFT

BACKGROUND OF THE INVENTION

1. Field of the Invention

The invention relates to a driveshaft produced in one piece by a forming operation, especially for driving a motor vehicle, designed in the form of a tubular shaft with a central tube region with a larger outer diameter, having end regions at both ends as well as toothed receiving regions for connecting elements for torque transmitting purposes.

2. Description of the Prior Art

DE-PS 30 09 277 purposes a driveshaft of this type for being used as a side shaft in the motor vehicle drive. The driveshaft substantially consists of a tubular shaft comprising two ends with stepped diameters with receiving regions for the joints. The entire central part of the tubular shaft is designed to be cylindrical and has the maximum outer diameter. In order to achieve a uniform mechanical strength over the entire region of the tubular shaft, the wall thickness is reduced with an increasing outer diater. The disadvantage of this design is that attention is paid to the aspect of mechanical strength only and that adjustment of the natural bending frequency to existing requirements can be achieved within a limited extent only, with the natural bending frequency as a rule being within the range of an excitation frequency of the engine/transmission system so that an interfering vibration noise cannot be avoided.

SUMMARY OF THE INVENTION

It is therefore the object of the present invention to provide a driveshaft whose vibration behaviour is improved by ensuring that the natural frequency values are set within a frequency range of minimum external excitation with the help of simple design means, thereby reducing the vibration noise.

In acccordance with the invention, the objective is achieved in that the driveshaft is designed to be rotationally symmetrical and asymmetrical in the longitudinal direction.

The asymmetric design of the driveshaft in the longitudinal direction ensures that the natural frequency is moved into the range of minimum external excitation energy values. An asymmetrical design can be achieved by displacing the centre of symmetry in the central tube region or by locating the centre of gravity of inertia outside the tubular shaft centre. Experience has shown that for example by displacing the centre of gravity of inertia towards one shaft end which in the subsequent assembled condition in the vehicle points towards the input parts with the greater mass, the vibration noise is clearly reduced, while the symmetry of rotation of the driveshaft is maintained.

In a first embodiment of the invention, one end of the central tube region comprises a cylindrically stepped projection with a smaller outer diameter or a conical projection.

By extending one end of the central tube region by a projection designed to be cylindrical or conical, the centre of symmetry of the central tube region of the driveshaft is displaced relative to the tubular shaft centre and its position may be varied within a wide range via the length of the projection, which also makes it possible to continuously move the natural frequency into a particularly advantageous range. In the central tube region where the outer diameter is uniform at least over the largest part, the wall thickness is kept approximately constant, thereby achieving a displacement of the centre of symmetry of the central tube region. The position of the centre of gravity of inertia is maintained by providing a different wall thickness in the region of the projection.

Alternatively, the centre of gravity of inertia may be displaced by providing a variable outer diameter, with the wall thickness remaining approximately constant or by ensuring that the inner and/or outer diameter of the central tube region of the driveshaft changes asymmetrically and at least partially continuously towards the tubular shaft.

By maintaining a constant wall thickness of the driveshaft while providing a uniform or variable outer and-/or inner diameter it is possible to achieve a distribution of cross-sectional area which is functionally optimised and which meets basic strength requirements, with the required torsional stiffness being adjusted and with the natural resonance frequency for the bending and torsional vibrations of the shaft being adapted to the respective requirements. This means that while rotational stiffness and acoustic behaviour are optimised, the load bearing capacity of the individual cross-sections may greatly exceed minimum requirements.

The asymmetrically stepped cross-section of the tubular shaft also results in a change in the bending stiffness towards the centre of the tubular shaft, which change, at the same time, permits a shift in the natural bending frequency, with the areas of transition having a conical inner and/or outer diameter. Furthermore, the inner diameter in the central tube region may be kept constant when the outer diameter changes as described with reference to the above-mentioned embodiments, in order to obtain an asymmetrical driveshaft.

With the above embodiments, the maximum outer diameter may be provided in the vicinity of an end region, with the central tube region of the driveshaft, between the second end region and the location of the maximum outer diameter, being designed to be conical or parabolic in the longitudinal direction.

Alternatively, it is feasible for the maximum outer diameter to be provided in the vicinity of the tubular shaft centre or in the vicinity of the two tube ends, with the central tube region, between the maximum and minimum outer diameters, being designed to be conical or parabolic in the longitudinal direction, thereby achieving a change in the cross-sectional area.

In all cases described so far it is possible to achieve an asymmetrical driveshaft which permits a displacement of the centre of symmetry of the central tube region and/or of the centre of gravity of inertia from the tubular shaft centre and from the natural bending frequency range. Additionally, with an embodiment where the maximum outer diameter is provided in the vicinity of the tubular shaft centre, it is possible, approximately, to copy the form of the first basic vibration of the tubular shaft and achieve a continuously increasing deformation resistance of the driveshaft towards the maximum outer diameter.

Furthermore, it is possible to displace the natural bending frequency by providing two different outer diameters in the centre of each half of the tubular shaft or by moving identical or different outer diameters from the centre of the respective half of the tubular shaft.

BRIEF DESCRIPTION OF THE DRAWINGS

Various embodiments of the invention will be described in more detail with reference to the drawings wherein

BRIEF DESCRIPTION OF THE DRAWINGS

Figure 1:
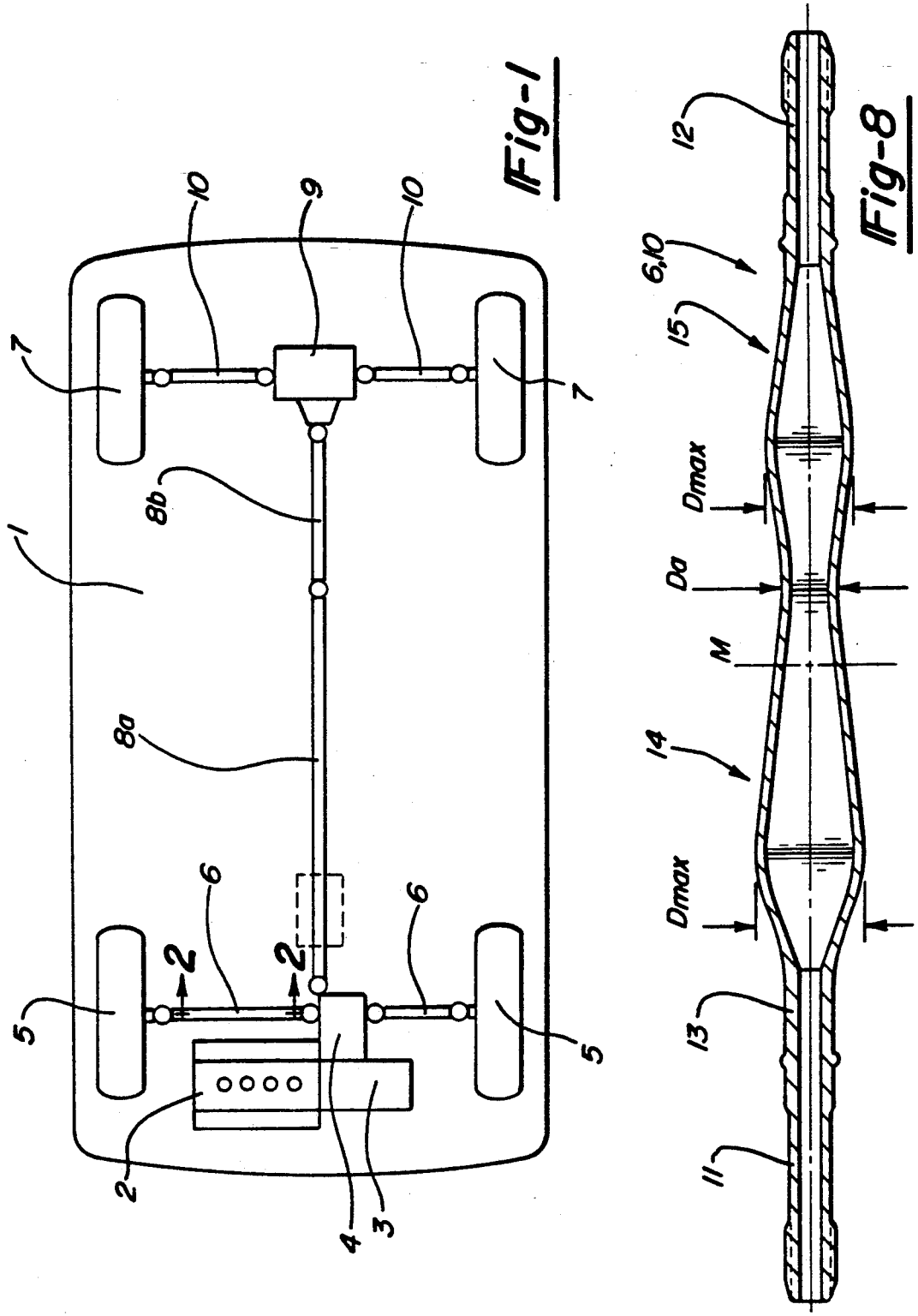

FIG. 1 shows a motor vehicle with front and rear driveshafts in accordance with the invention.

Figure 2:
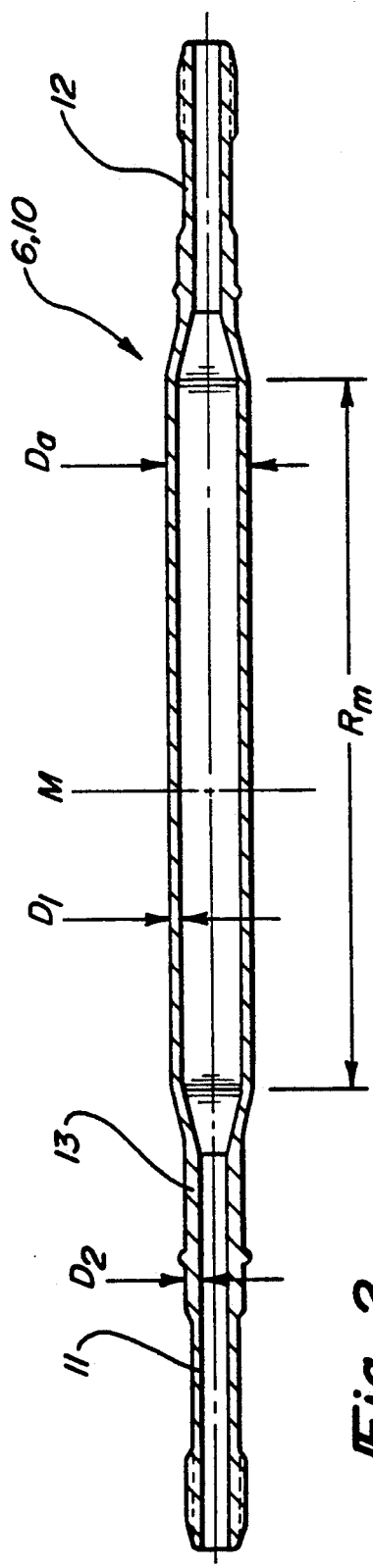

FIG. 2 is a longitudinal section through line 2—2 of FIG. 1 a first embodiment of the driveshaft.

FIGS. 3–8 each show a longitudinal section through further embodiments of the driveshaft.

DESCRIPTION OF THE PREFERRED EMBODIMENT

FIG. 1 shows a diagrammatic view of a motor vehicle 1 which, via a front engine 2 with a gearbox 3 and a front axle differential 4, drives the front wheels 5 via front driveshafts 6. The driving torque for the rear wheels is branched off the front axle differential 4 and is transmitted via a divided propeller shaft 8a, 8b to a rear axle differential 9. The rear axle differential 9 drives the rear wheels 7 via rear driveshafts 10. The front and rear driveshafts 6, 10 and the divided propeller shaft 8a, 8b may be designed in accordance with the invention.

Figure 3:
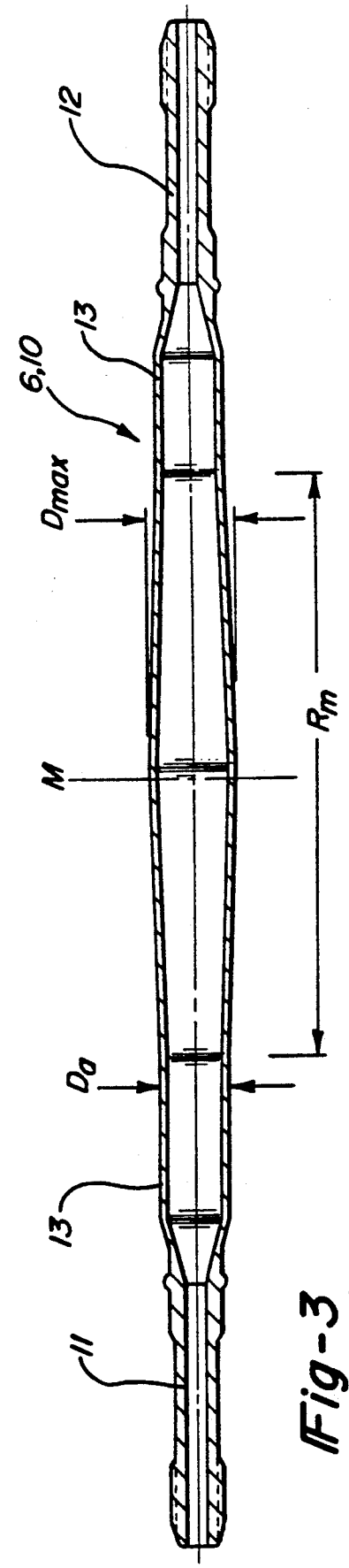

FIGS. 2 to 8 each illustrate a driveshaft 6, 8, 10 which, with its toothed receiving regions at the end regions 11, 12, is accommodated in corresponding recesses of an inner joint member (not illustrated). With the embodiments illustrated, the wall thickness $D_1$ remains unchanged along the entire length of the central tubular shaft region $R_m$. However, it is also conceivable for the wall thickness $D_1$ to change continuously in the central tube region $R_m$ of the tubular shaft and for it to be designed asymmetrically towards the tubular shaft centre M or for the cross-section of the tubular shaft to be stepped. FIGS. 2, 3 and 5 show the symmetrical central tube region $R_m$, with the centre of symmetry being displaced from the tubular shaft centre M, whereas FIGS 4, 6 to 8 show the centre of gravity of inertia being displaced from the tubular shaft centre M, which means that in all embodiments the driveshaft 6, 8, 10 is asymmetrical.

FIG. 2 shows a cylindrical driveshaft 6, 8, 10, for example, with a constant wall thickness $D_1$ in the central tube region $R_m$ and a projection 13 with a different wall thickness $D_2$ provided at one end, which is also designed to be cylindrical and has a stepped outer diameter $D_a$ and which extends the end region 11 of the driveshaft 6, 10. As a result of the projection 13, the centre of symmetry of the central tube region $R_m$ is displaced from the tubular shaft centre M, and instead of the cylindrical projection 13 it is also conceivable to provide a conical projection, with the region between the different outer diameters $D_a$ consisting of conical areas of transition.

FIG. 3 shows a driveshaft 6, 8, 10 which, in the vicinity of the tubular shaft centre M, comprises the maximum outer diameter $D_{max}$ and a uniform wall thickness $D_1$. A displacement of the maximum outer diameter $D_{max}$ out of the tubular shaft centre M and thus a displacement of the centre of symmetry of the central tube region $R_m$ out of the tubular shaft centre M is achieved by providing extended cylindrical projections 13 at both ends of the end regions 11, 12, with the projection at the end associated with the end region 11 being longer and with both projections 13 being provided with a smaller outer diameter $D_a$. The region between the maximum and minimum outer diameter $D_a$ of the driveshaft 6, 8, 10 is designed to be conical.

FIG. 4 shows a driveshaft 6, 8, 10 with the maximum outer diameter $D_{max}$ being provided in the vicinity of an end region 11, 12. In the region between the minimum and maximum outer diameter $D_{max}$, the driveshaft 6, 8, 10 is also designed to be conical, and between the end region 11 and the maximum outer diameter $D_{max}$, there is provided a cylindrically stepped projection 13, with the wall thickness $D_2$ of the projection 13 being different from the wall thickness $D_1$ of the conical region.

FIG. 5 shows a driveshaft 6, 8, 10 having its maximum outer diameters $D_{max}$ in the vicinity of the two end regions 11, 12, with the projections between the maximum outer diameter $D_{max}$ and the end regions 11, 12 each being conical and having different axial lengths. The central tube region $R_m$ between the two maximum outer diameters $D_{max}$ and the minimim outer diameter $D_a$ is also conical.

FIGS. 6 and 7 each illustrate a driveshaft 6, 8, 10 having a maximum outer diameter $D_{max}$ in the vicinity of an end region 11, with the central tube region extending conically as far as the opposite end region 12. At the maximum outer diameter $D_{max}$ end, there is provided a short conical area of transition which is extended by a cylindrically stepped projection 13 and passes into the end region 11. The wall thickness $D_2$ in the region of the projection differs from the wall thickness $D_1$ of the central tube region $R_m$. FIGS. 6, 7 differ in respect of the maximum outer diameter $D_{max}$ at the one end of the tubular shaft and its distance from the end region 11.

FIG. 8 shows a driveshaft 6, 8, 10 which comprises a different maximum outer diameter $D_{max}$ in the vicinity of the centre of each half 14, 15 of the tubular shaft, with the minimum outer diameter $D_a$ being provided outside the tubular shaft centre M. As described in connection with FIG. 7, the end region 11 is extended by a cylindrical projection 13, with the regions between the different outer diameters $D_{max}$ and the minimum outer diameter $D_a$ each being designed to be conical.

We claim:

1. A one piece driveshaft especially for use in the drive of a motor vehicle with input and output parts, said driveshaft comprising:
   a tubular homogeneous shaft having a central tube region and end regions at both ends, said central tube region being a larger outer diameter than said end regions, toothed receiving regions formed on said end regions for connecting elements with said drive shaft for torque transmitting purposes, and the driveshaft being rotationally symmetrical about a longitudinal axis and asymmetrical with respect to a central plane transverse to the longitudinal axis.

2. A driveshaft according to claim 1, wherein the center of gravity of the driveshaft is arranged outside the tubular shaft center.

3. A driveshaft according to claim 1, wherein one end of the central tube region includes a cylindrically stepped projection with a smaller outer diameter.

4. A driveshaft according to claim 1, wherein one end of the central tube region comprises a conical projection.

5. A driveshaft according to claim 1, wherein the central tube region, over at least its largest part, is given a uniform outer diameter and that the wall thickness is designed to be approximately constant.

6. A driveshaft according to claim 1, wherein the wall thickness of the central tube region is designed to be approximately constant while the outer diameter is variable.

7. A driveshaft according to claim 1, wherein the inner diameter and the outer diameter of the central tube region changes asymmetrically and at least partially continuously relative to the tubular shaft center.

8. A driveshaft according to claim 1, wherein the diameter of the central tube region is stepped asymmetrically, with the transition regions between the stepped diameter regions comprising a conical inner diameter or outer diameter.

9. A driveshaft according to claim 1, wherein the inner diameter is kept constant in the central tube region.

10. A driveshaft according to claim 1, wherein the maximum outer diameter of the central tube region is positioned in the vicinity of an end region.

11. A driveshaft according to claim 1, wherein the central tube region, at least between an end region and the location of the maximum outer diameter, is designed to be conical or parabolic in the longitudinal direction.

12. A driveshaft according to claim 1, wherein the maximum outer diameter of the central tube region is located in the vicinity of the tubular shaft centre.

13. A driveshaft according to claim 1, wherein the maximum outer diameter of the central tube region, in each case, is located in the vicinity of the two end regions.

14. A driveshaft according to claim 1, wherein the central tube region between the maximum and minimum outer diameter, in each case, is designed to be conical or parabolic in the longitudinal direction.

15. A driveshaft according to claim 1, wherein the centre of each half of the tubular shaft there is provided a different maximum outer diameter.

16. A driveshaft according to claim 1, wherein the vicinity of the centre of each half of the tubular shaft there is provided the same or a different outer diameter.

17. A driveshaft according to claim 1, wherein the inner diameter or the outer diameter of the central tube region changes asymmetrically and at least partially continuously relative to the tubular shaft center.

* * * * *